Feb. 12, 1929. 1,701,945
E. G. BUSSE
MOUNTING FOR BRAKE BEAM SAFETY BARS
Filed Oct. 26, 1925   3 Sheets-Sheet 2
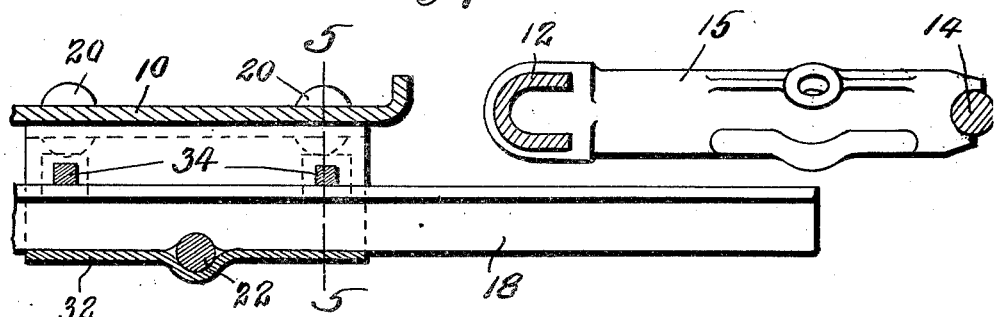
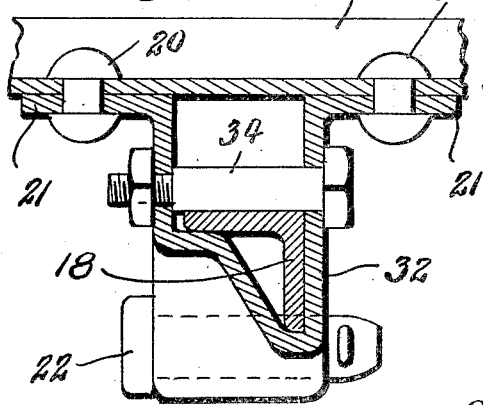
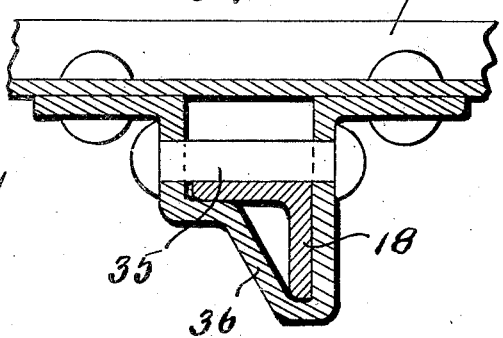
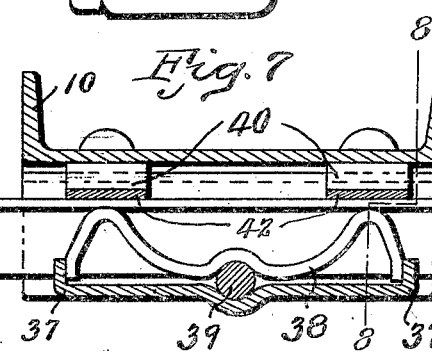
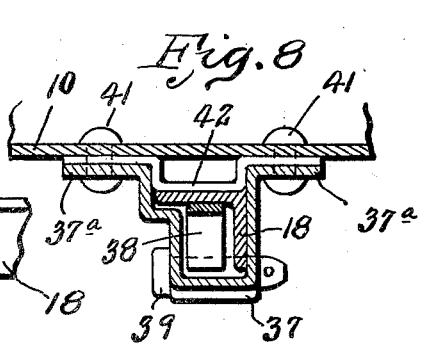
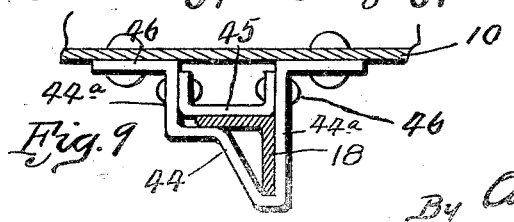
Inventor
Edwin G. Busse
By Cornwall, Bedell & Janus
Att'ys.

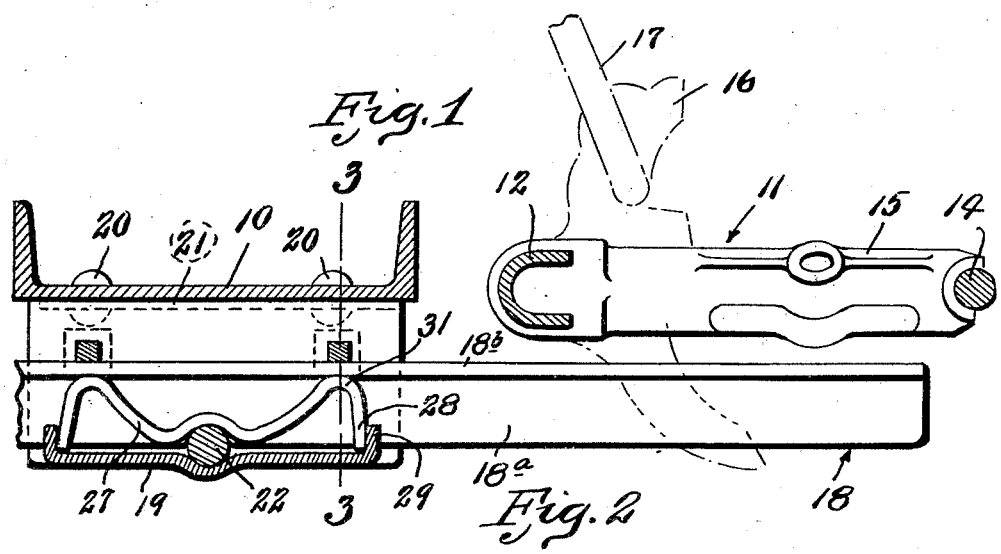
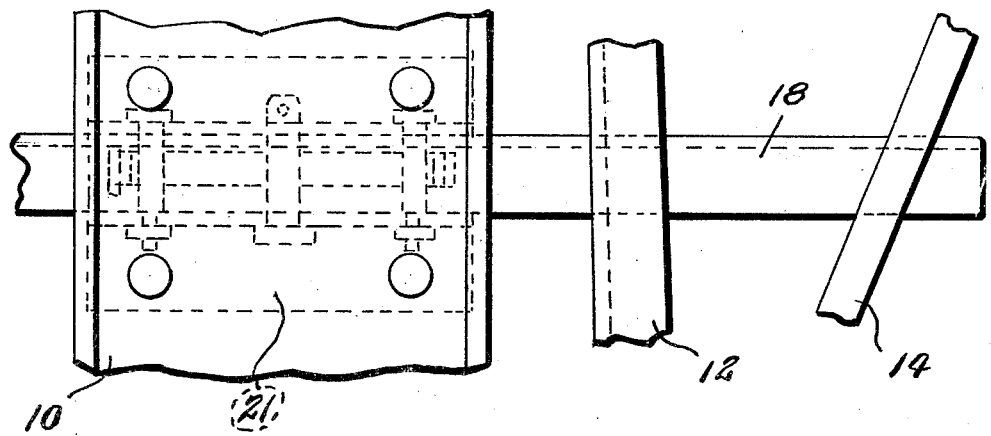
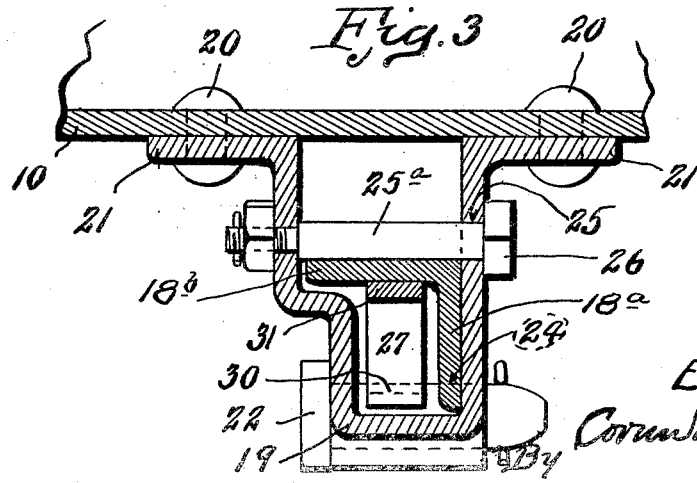

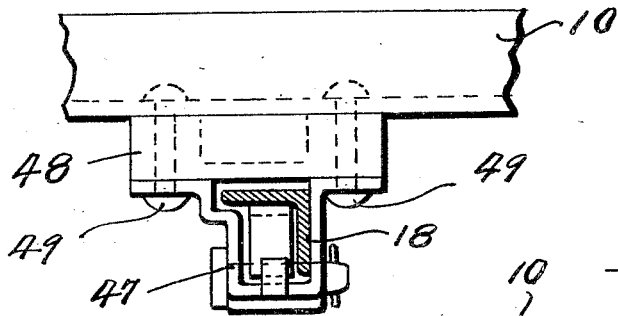
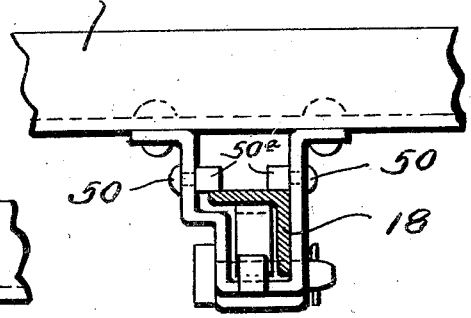
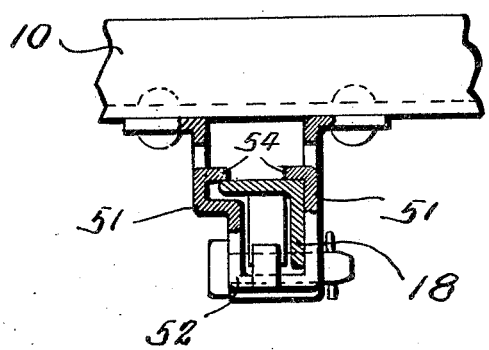
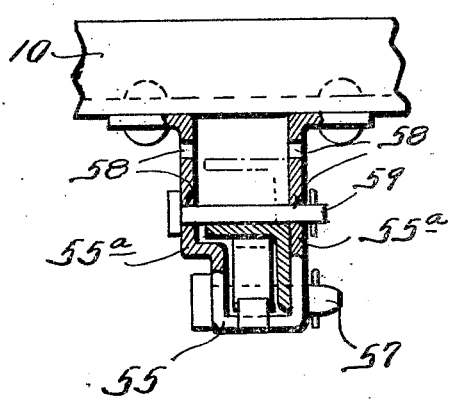
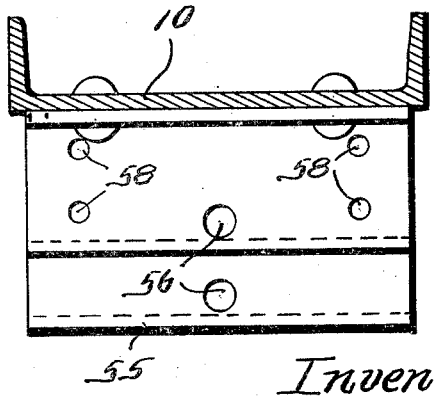

Patented Feb. 12, 1929.

1,701,945

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

MOUNTING FOR BRAKE-BEAM SAFETY BARS.

Application filed October 26, 1925. Serial No. 64,996.

This invention relates to new and useful improvements in mountings for brake beam safety guards or supports, and the objects of the invention are to provide a mounting which is extended downwardly so as to position the safety bar supported by said mounting below and in proper relation with the brake beam, and to provide suitable means arranged transversely in said mounting and bearing on top of said bar to prevent the upward movement thereof.

Further objects of the invention are to provide a supporting bracket adapted to receive a brake beam safety bar or support and resiliently supporting the same, and means transversely disposed in said bracket and engaging the top of said bar for limiting the upward movement of said bar.

With these and other objects in view, my invention consists in certain novel features of construction and arrangement of parts, hereinafter more fully described and claimed, and illustrated in the accompanying drawings, in which—

Figure 1 is a side elevational view of the safety bar showing the spring plank and the mounting for said bar in cross section.

Figure 2 is a plan view of Figure 1.

Figure 3 is a vertical cross section taken on lines 3—3 of Figure 1.

Figure 4 is a side elevational view of the support bar and showing the same supported in the mounting without the use of a resilient member.

Figure 5 is a vertical cross section taken on line 5—5 of Figure 4.

Figure 6 is a vertical cross section showing a modified form of the invention.

Figure 7 is a cross section through the mounting and showing a modified form of transverse member for bearing on the top of the safety bar.

Figure 8 is a vertical cross section taken on line 8—8 of Figure 7.

Figure 9 is a vertical cross section similar to Figure 8 but showing the safety bar rigidly supported in the mounting.

Figure 10 shows another modified form of mounting.

Figure 11 shows a mounting provided with spacing projections riveted to the side walls of the mounting.

Figure 12 shows the spacing projections formed integral with the walls of the mounting bent into engaging positions.

Figures 13 and 14 show a modified form of mounting wherein the side walls thereof are provided with a series of apertures disposed in vertical planes to properly space the safety bar.

Referring by numerals to the accompanying drawings, 10 indicates the spring plank of a car truck. 11 indicates a trussed brake beam comprising a compression member 12, a tension member 14, and a strut 15. A brake head 16 is supported on each side of the brake beam and engaging each brake head is a hanger 17 which operatively supports the brake beam in position. Underlying each brake beam is a safety bar or support 18 carried by a mounting 19 which is secured to the underside of spring plank 10 by suitable fastening devices 20. Mounting or bracket 19 is preferably formed U-shape in cross section and is provided with horizontally disposed side flanges 21 which are apertured to receive the fastening devices 20.

A transverse pin 22 is centrally disposed in the lower portion of mounting 19 and is seated in apertures formed in the side walls 19$^a$ of said mounting. The edge of flange 18$^a$ of bar 18 is provided with a downwardly opening recess or seat 24 which, when pin 22 is placed in position, is engaged by said pin, thereby locking bar 18 against longitudinal movement. The walls 19$^a$ are provided with aligned apertures 25 which are disposed a suitable distance above and to each side of aperture-receiving pin 22.

A pin 26 is seated in each pair of aligned apertures 25 and bears on top of bar 18, thereby preventing upward movement of said bar and maintaining it in interlocked relation with pin 22. A resilient member 27 is arranged in bracket 19 and has its downwardly turned ends 28 bearing against lips 29 which latter are formed by bending upwardly portions of the bottom wall of bracket 19. The central portion of resilient member 27 is provided with a downwardly presented seat 30 which is adapted to be engaged by pin 22, thereby distoring upwardly said central portion of member 27 and increasing the tension of said member. The upwardly curved portions 31 of member 27 bear against the underside of the horizontally disposed flange 18$^b$ of bar 18, thereby forming resilient connection between bracket 19 and said bar 18. Portions 31 engage bar 18 at points preferably located close to transverse members 25 and said members form stops to prevent undue upward movement of said bar. Members 25 are preferably formed square in cross section as indicated at 25ª in order to provide maximum bearing surface for engaging bar 18.

In the form shown in Figures 1 to 3, the safety support or bar is resiliently supported in the bracket or mounting and this resilient support prevents vibration of the parts and eliminates rattling, thereby increasing the life of the fastening devices.

In the form shown in Figures 4 and 5, the bar 18 is rigidly supported in mounting 32, said bar resting on the bottom wall of said mounting and is held thereagainst by transverse members 34 which are seated in the side walls of mounting 32 and bear on top of bar 18.

In the preceding forms, the transverse members 25 and 34 are shown as bolts being removable from the brackets. In the form shown in Figure 6, transverse member 35 is shown in the form of a rivet being permanently fixed to mounting 36.

In the form shown in Figures 7 and 8, bar 18 is resiliently supported in the mounting 37 by a resilient member 38 and is locked against longitudinal movement by a pin 39. Transverse members 40 bear on top of bar 18 and prevent it from moving in a vertical plane. These members consist of a strap, the ends of which are interposed between the horizontally disposed attaching flanges 37ª of mounting 37 and the underside of spring plank 10 and are apertured for receiving the fastening devices 41 by means of which the mounting is secured to the spring plank. The central portion of each strap 40 is depressed as indicated at 42 and extends downwardly between the side walls of mounting 37 and bears on top of bar 18 to act as stops for said bar.

The form shown in Figure 9 shows bar 18 rigidly supported in a bracket or mounting 44 and a transverse member 45 is attached to the side walls of said bracket by fastening devices, such as rivets 46.

In Figure 10 another modified form is shown wherein bar 18 is supported in the mounting 47 and the latter is spaced from the spring plank 10 by spacers 48 which are secured in position by rivets 49 which are also used in attaching the mounting.

In the form shown in Figure 11 the bar 18 is spaced from the spring plank 10 by projections or rivets 50 having enlarged heads 50ª. Said projections are fixed to the side walls of the mounting.

The modified form shown in Figure 12 discloses the side walls 51 of mounting 52 provided with integral lateral projections or lips 54 formed by cutting and bending inwardly portions of the walls 51.

Figures 13 and 14 show another modified form wherein a mounting 55 is formed with extended side walls 55ª and the latter are provided with a plurality of centrally disposed apertures 56 spaced in vertical plane for receiving a locking pin 57 which engages the transverse seat of bar 18 and locks the latter against longitudinal movement and supports it. A vertically disposed row of apertures 58 is arranged on each side of apertures 56 and receive pins 59 resting on top of bar 18 and locking the latter against upward movement. Apertures 58 are arranged in horizontal series, each of which is in a definite correlation with a corresponding aperture 56, whereby by inserting pin 57 and pins 59 in the respective apertures, bar 18 is locked in mounting 55. Thus bar 18 may be carried by said mounting in one position close to the spring plank and in another spaced therefrom in case the brake beam is hung low.

Reference is here made to applicant's copending application Serial No. 101,394, filed April 12, 1926 and directed to subject matter a part of which is disclosed in the present application.

I claim:

1. In a support, guard or guide for brake beams, the combination of a bracket adapted to be attached to a truck part and provided with a seat for receiving a safety bar, a pin seated transversely in the side walls of said bracket and adapted to engage a notch in the bottom of said bar for locking the latter against longitudinal movement, a leaf spring interposed between the bottom wall of said bracket and the underside of said safety bar for resiliently supporting the latter, and means extending laterally of said bracket and adapted to bear on top of said bar for holding the latter in spaced relation with said truck part and in engagement with said leaf spring.

2. In a support, guard or guide for brake beams, a bracket adapted to be attached to a truck part and to receive a support, guard or guide bar, a transverse pin seated in said bracket and engaging said bar to hold the latter against longitudinal movement, a spring in said bracket for yieldingly supporting the latter, and means carried by said bracket and engaging said bar for holding the latter in engagement with said spring and spaced from said truck parts.

3. In a support, guard or guide for a brake beam, a bracket adapted to be applied to a truck part, a yielding member carried by said bracket, a bar extending through said bracket and supported by said member, and means carried by said bracket above said member for holding said bar below the top of said bracket and against upward movement by said member.

4. In a support, guard or guide for a brake beam, a bracket adapted to be applied to a truck part, a yielding member carried by said bracket, a bar extending through said bracket and supported by said member, and elements spaced longitudinally of said bar and carried by said bracket above said bar for holding said bar below the top of said bracket and against upward movement by said member.

5. In a mounting for a brake beam support, guard or guide bar, a bracket including spaced side walls each provided with vertically spaced apertures, a spring in said bracket for yieldingly supporting a bar extending through the same, and means adapted to be seated in either of said apertures for adjustably limiting upward movement of said bar under pressure of said spring.

6. In a mounting for a brake beam support, guard or guide bar, a bracket including spaced side walls each provided with vertically spaced apertures, a spring in said bracket for yieldingly supporting a bar extending through the same, means adapted to be seated in either of said apertures for adjustably limiting upward movement of said bar under pressure of said spring, said walls having other apertures in definite relation to said first mentioned apertures, and a member adapted to be seated in either of said second mentioned apertures for positioning said bar longitudinally in said bracket.

7. In a mounting for a brake beam support, guard or guide bar, a bracket including spaced side walls each provided with a pair of apertures, located at the same level and spaced longitudinally of said bracket, and a second pair of apertures located at a different level and spaced longitudinally of said bracket, a spring in said bracket for yieldingly supporting a bar extending through the same, and means adapted to be seated in either pair of said apertures for adjustably limiting upward movement of said bar under pressure of said spring.

8. In a mounting for a brake beam support, guard or guide bar, a bracket including spaced side walls each provided with a pair of apertures, located at the same level and spaced longitudinally of said bracket, and a second pair of apertures located at a different level and spaced longitudinally of said bracket, a spring in said bracket for yieldingly supporting a bar extending through the same, means adapted to be seated in either pair of said apertures for adjustably limiting upward movement of said bar under pressure of said spring, and removable means carried by said bracket for positioning said bar longitudinally of said bracket.

9. In a support, guard or guide for brake beams, the combination of a bar adapted to extend under the beam, a U-shaped bracket adapted to be secured to a car truck part for detachably supporting said bar, resilient means interposed between said bar and said bracket to absorb vibration and to hold said bar in position, and means disposed transversely within said bracket, below the top thereof, and bearing on the top of said bar for preventing upward movement thereof against the pressure of said spring.

10. In a support, guard or guide for brake beams, the combination of a bar adapted to extend under the beam, a U-shaped bracket adapted to be secured to a car truck part for detachably supporting said bar, resilient means interposed between said bar and said bracket to absorb vibration and to hold said bar in position, and means disposed transversely of said bracket, below the top thereof, and spaced longitudinally thereof and bearing on top of said bar for preventing upward movement thereof against the pressure of said spring.

11. In a support, guard or guide for brake beams, the combination of a bar adapted to extend under the beam, a U-shaped bracket adapted to be secured to a car truck part for detachably supporting said bar, resilient means interposed between said bar and said bracket to absorb vibration and to hold said bar in position, means disposed transversely within said bracket, below the top thereof, and bearing on the top of said bar for preventing upward movement thereof against the pressure of said spring, and removable means engaging said bracket and bar to prevent longitudinal movement of said bar from said bracket.

12. In a support, guard or guide for brake beams, the combination of a bar adapted to extend under the beam, a U-shaped bracket adapted to be secured to a car truck part for detachably supporting said bar, resilient means interposed between said bar and said bracket to absorb vibration and to hold said bar in position, members disposed transversely of said bracket, below the top thereof, and spaced longitudinally thereof and engaging said bar for preventing upward movement thereof against the pressure of said spring, and removable means engaging said bracket and bar to prevent longitudinal movement of said bar from said bracket.

13. In a support, guard or guide for brake beams, a bracket adapted to be attached to a truck part, a bar extending therethrough to project under an adjacent beam, and means for resiliently supporting said bar at selected vertical positions relative to said truck part.

14. In a support for brake beams, a bracket adapted to be applied to a truck part, a bar arranged in said bracket and extending therefrom, a bar positioning member extending transversely of said bracket, a yielding support for said bar, and means carried by the sides of said bracket and bearing on top of said bar for holding said bar against said support.

15. In a support for brake beams, a bracket adapted to be attached to a truck part, a brake beam support guard or guide bar yieldingly carried by said bracket and spaced below the top of said bracket, means carried by said bracket for engaging a downwardly facing surface on said bar and locking it against longitudinal movement, and a member for engaging an upwardly facing surface on said bar for maintaining the latter in engagement with said means.

16. A support for brake beams comprising a bracket adapted to be applied to the lower face of a truck part, a brake beam support guard or guide bar extending through said bracket or yieldingly mounted therein, an element carried by said bracket and spaced below the top thereof and engaging a downwardly facing surface on said bar, and an element carried by said bracket and engaging an upwardly facing surface on said bar, one of said elements being removable from said bracket.

In testimony whereof I hereunto affix my signature this 12th day of October, 1925.

EDWIN G. BUSSE.